United States Patent
Wang (10) Patent No.: US 12,396,008 B2
(45) Date of Patent: Aug. 19, 2025

(54) TRANSMISSION METHOD, DEVICE AND APPARATUS, AND COMPUTER-READABLE STORAGE MEDIUM

(71) Applicant: DATANG MOBILE COMMUNICATIONS EQUIPMENT CO., LTD., Beijing (CN)

(72) Inventor: Lei Wang, Beijing (CN)

(73) Assignee: Datang Mobile Communications Equipment Co., Ltd, Beijing (CN)

( * ) Notice: Subject to any disclaimer, the term of this patent is extended or adjusted under 35 U.S.C. 154(b) by 502 days.

(21) Appl. No.: 17/801,025

(22) PCT Filed: Jan. 14, 2021

(86) PCT No.: PCT/CN2021/071711
§ 371 (c)(1),
(2) Date: Aug. 19, 2022

(87) PCT Pub. No.: WO2021/164477
PCT Pub. Date: Aug. 26, 2021

(65) Prior Publication Data
US 2023/0102005 A1    Mar. 30, 2023

(30) Foreign Application Priority Data
Feb. 21, 2020   (CN) ............... 20201010107293.9

(51) Int. Cl.
*H04W 72/232*   (2023.01)
*H04L 5/00*   (2006.01)

(52) U.S. Cl.
CPC ......... *H04W 72/232* (2023.01); *H04L 5/0053* (2013.01)

(58) Field of Classification Search
CPC ................ H04L 5/0053; H04W 72/232
(Continued)

(56) References Cited

U.S. PATENT DOCUMENTS

| | | |
|---|---|---|
| 10,419,162 B2 | 9/2019 | Hakola et al. |
| 10,567,143 B2 | 2/2020 | Son |

(Continued)

FOREIGN PATENT DOCUMENTS

| | | |
|---|---|---|
| CN | 109788565 A | 5/2019 |
| WO | WO-2018/144852 A1 | 8/2018 |
| WO | WO-2020/035060 A1 | 2/2020 |

OTHER PUBLICATIONS

First Office Action issued Apr. 6, 2022 in Chinese Application No. 202010107293.9.

(Continued)

*Primary Examiner* — Peter G Solinsky
(74) *Attorney, Agent, or Firm* — Harness, Dickey & Pierce, P.L.C.

(57) ABSTRACT

The present disclosure provides a transmission method, a transmission device, a transmission device, and a computer-readable storage medium. The transmission method includes: receiving downlink control channel transmission time domain pattern configuration information from a network device; and determining a time domain resource range for transmission of a downlink control channel in accordance with the downlink control channel transmission time domain pattern configuration information.

20 Claims, 7 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2016/0360551 A1* | 12/2016 | Bergman | H04W 72/02 |
| 2018/0123859 A1* | 5/2018 | Liu | H04L 5/0053 |
| 2018/0352601 A1* | 12/2018 | Park | H04W 72/569 |
| 2019/0150142 A1 | 5/2019 | Huang et al. | |
| 2019/0165880 A1* | 5/2019 | Hakola | H04L 1/1854 |
| 2019/0199503 A1 | 6/2019 | Son | |
| 2019/0215861 A1 | 7/2019 | Son | |
| 2020/0021419 A1* | 1/2020 | Taherzadeh Boroujeni | H04L 5/0091 |
| 2020/0267571 A1* | 8/2020 | Park | H04L 5/0051 |
| 2021/0160827 A1* | 5/2021 | Kim | H04L 5/0094 |
| 2022/0046612 A1* | 2/2022 | Ma | H04W 72/23 |

OTHER PUBLICATIONS

Written Opinion/International Search Report issued Apr. 15, 2021 in International Application No. PCT/CN2021/071711.
Nokia et al., "Summary of maintenance related to rate-matching in NR" 3GPP TSG-Ran WG1 #94 R1-1809746, May 25, 2018.
Extended European Search Report issued Jul. 25, 2023 in European Application No. 21757330.2.

* cited by examiner

TRANSMISSION METHOD, DEVICE AND APPARATUS, AND COMPUTER-READABLE STORAGE MEDIUM

CROSS-REFERENCE TO RELATED APPLICATIONS

This application is the U.S. national phase of PCT Application No. PCT/CN2021/071711 filed on Jan. 14, 2021, which claims a priority of the Chinese patent application No. 202010107293.9 filed on Feb. 21, 2020, each of which are incorporated herein by reference in their entireties.

TECHNICAL FIELD

The present disclosure relates to the field of communication technology, in particular to a transmission method, a transmission device, a transmission device, and a computer-readable storage medium.

BACKGROUND

In a conventional radio system, a network side configures a downlink channel Control Resource Set (CORESET) for a terminal in a bandwidth in accordance with the requirement on configuration, and configures a search space in the bandwidth. One downlink control channel is merely transmitted in the CORESET within one slot, and the terminal detects and receives the downlink control channel in the CORESET.

Low-function terminals will be introduced in a network, and this kind of terminals have such a characteristic as low hardware cost, long stand-by time, and a large quantity of terminals. Correspondingly, a transmission bandwidth of the terminal is usually very small, e.g., several MHz. In addition, due to a decrease in the hardware cost, a channel processing capability and the transmission performance are deteriorated to some extent, e.g., fewer transmission/reception antennae are provided. Due to the constraint on the hardware, the reception performance for a downlink channel is adversely affected inevitably.

In order to ensure the transmission performance for the downlink control channel, the downlink control channel is transmitted by the network side at a high aggregation level, and the aggregation level is limited by a size of the CORESET. In a conventional system, at most three Orthogonal Frequency Division Multiplexing (OFDM) symbols are occupied by the CORESET in a time domain. When a frequency-domain resource is limited, a physical resource in the CORESET is insufficient to carry a larger aggregation level, so the transmission performance is adversely affected.

SUMMARY

An object of the present disclosure is to provide a transmission method, a transmission device, a transmission device, and a computer-readable storage medium, so as to ensure the transmission of the downlink control channel at a high aggregation level in a small-bandwidth scenario.

In a first aspect, the present disclosure provides in some embodiments a transmission method performed by a terminal, including: receiving downlink control channel transmission time domain pattern configuration information from a network device; and determining a time domain resource range for transmission of a downlink control channel in accordance with the downlink control channel transmission time domain pattern configuration information.

In some possible embodiments of the present disclosure, the receiving the downlink control channel transmission time domain pattern configuration information from the network device includes receiving the downlink control channel transmission time domain pattern configuration information carried in high-layer signaling from the network device, and the determining the time domain resource range for the transmission of the downlink control channel in accordance with the downlink control channel transmission time domain pattern configuration information includes determining a resource position to which a search space is mapped in accordance with the downlink control channel transmission time domain pattern configuration information.

In some possible embodiments of the present disclosure, the downlink control channel transmission time domain pattern configuration information includes CORESET configuration information carried in Radio Resource Control (RRC) signaling, and the CORESET configuration information includes CORESET time domain pattern information.

In some possible embodiments of the present disclosure, the CORESET time domain pattern information includes at least one resource position occupied by a CORESET in a time domain.

In some possible embodiments of the present disclosure, the CORESET time domain pattern information includes a bitmap having a length of N, and each bit in the bitmap corresponds to M slots or M OFDM symbols, where each of N and M is an integer greater than or equal to 1.

In some possible embodiments of the present disclosure, M is predefined through a protocol, or configured through high-layer signaling.

In some possible embodiments of the present disclosure, when a bit in the bitmap has a first value, the CORESET occupies corresponding time/frequency domain resources within the M slots or M OFDM symbols corresponding to the bit, and when the bit in the bitmap has a second value, there is no CORESET time/frequency domain resource within the M slots or M OFDM symbols corresponding to the bit.

In some possible embodiments of the present disclosure, the CORESET time domain pattern information includes the quantity of time domain positions and a time domain gap occupied by the CORESET in the time domain.

In some possible embodiments of the present disclosure, the CORESET time/frequency domain resource in each time domain position is determined in accordance with CORESET time/frequency domain configuration information.

In some possible embodiments of the present disclosure, the time domain gap is 0, or a unit of the time domain gap is M slots or M OFDM symbols.

In some possible embodiments of the present disclosure, the downlink control channel transmission time domain pattern configuration information includes search space time domain pattern configuration information carried in RRC signaling.

In some possible embodiments of the present disclosure, the search space time domain pattern configuration information is used to indicate that the search space occupies one time domain unit or a plurality of consecutive or discrete time domain units in the time domain, and the time domain unit includes K slots or K OFDM symbols, where K is a positive integer greater than 1.

In some possible embodiments of the present disclosure, the search space time domain pattern configuration information is used to indicate that a Physical Downlink Control Channel (PDCCH) candidate in the search space is mapped on one time domain unit or a plurality of consecutive or discrete time domain units.

In some possible embodiments of the present disclosure, the determining the time domain source range for the transmission of the downlink control channel includes: mapping and creating the search space at the at least one time domain position of a CORESET; and detecting and receiving the downlink control channel in the search space.

In a second aspect, the present disclosure provides in some embodiments a transmission method performed by a network device, including transmitting downlink control channel transmission time domain pattern configuration information to a terminal, the downlink control channel transmission time domain pattern configuration information being used by the terminal to determine a time domain resource range for transmission of a downlink control channel.

In some possible embodiments of the present disclosure, the transmission method further includes transmitting the downlink control channel within the time domain resource range determined in accordance with the downlink control channel transmission time domain pattern configuration information.

In some possible embodiments of the present disclosure, the transmitting the downlink control channel transmission time domain pattern configuration information to the terminal includes transmitting the downlink control channel transmission time domain pattern configuration information carried in high-layer signaling to the terminal, and the downlink control channel transmission time domain pattern configuration information is used by the terminal to determine a resource position to which a search space is mapped.

In some possible embodiments of the present disclosure, the downlink control channel transmission time domain pattern configuration information includes CORESET configuration information carried in signaling, and the CORESET configuration information includes CORESET time domain pattern information.

In some possible embodiments of the present disclosure, the CORESET time domain pattern information includes at least one resource position occupied by a CORESET in a time domain.

In some possible embodiments of the present disclosure, the CORESET time domain pattern information includes a bitmap having a length of N, and each bit in the bitmap corresponds to M slots or M OFDM symbols, where each of N and M is an integer greater than or equal to 1.

In some possible embodiments of the present disclosure, M is predefined through a protocol, or configured through high-layer signaling.

In some possible embodiments of the present disclosure, when a bit in the bitmap has a first value, the CORESET occupies corresponding time/frequency domain resources within the M slots or M OFDM symbols corresponding to the bit, and when the bit in the bitmap has a second value, there is no CORESET time/frequency domain resource within the M slots or M OFDM symbols corresponding to the bit.

In some possible embodiments of the present disclosure, the CORESET time domain pattern information includes the quantity of time domain positions and a time domain gap occupied by the CORESET in the time domain.

In some possible embodiments of the present disclosure, the CORESET time/frequency domain resource in each time domain position is determined in accordance with CORESET time/frequency domain configuration information.

In some possible embodiments of the present disclosure, the time domain gap is 0, or a unit of the time domain gap is M slots or M OFDM symbols.

In some possible embodiments of the present disclosure, the downlink control channel transmission time domain pattern configuration information includes search space time domain pattern configuration information carried in RRC signaling.

In some possible embodiments of the present disclosure, the search space time domain pattern configuration information is used to indicate that the search space occupies one time domain unit or a plurality of consecutive or discrete time domain units in the time domain, and the time domain unit includes K slots or K OFDM symbols, where K is a positive integer greater than 1.

In some possible embodiments of the present disclosure, the search space time domain pattern configuration information is used to indicate that a PDCCH candidate in the search space is mapped on one time domain unit or a plurality of consecutive or discrete time domain units.

In a third aspect, the present disclosure provides in some embodiments a transmission device arranged at a terminal, including: a reception module configured to receive downlink control channel transmission time domain pattern configuration information from a network device; and a determination module configured to determine a time domain resource range for transmission of a downlink control channel in accordance with the downlink control channel transmission time domain pattern configuration information.

In some possible embodiments of the present disclosure, the reception module is further configured to receive the downlink control channel transmission time domain pattern configuration information carried in high-layer signaling from the network device, and the determination module is further configured to determine a resource position to which a search space is mapped in accordance with the downlink control channel transmission time domain pattern configuration information.

In some possible embodiments of the present disclosure, the downlink control channel transmission time domain pattern configuration information includes CORESET configuration information carried in RRC signaling, and the CORESET configuration information includes CORESET time domain pattern information.

In some possible embodiments of the present disclosure, the CORESET time domain pattern information includes at least one resource position occupied by a CORESET in a time domain.

In some possible embodiments of the present disclosure, the CORESET time domain pattern information includes a bitmap having a length of N, and each bit in the bitmap corresponds to M slots or M OFDM symbols, where each of N and M is an integer greater than or equal to 1.

In some possible embodiments of the present disclosure, M is predefined through a protocol, or configured through high-layer signaling.

In some possible embodiments of the present disclosure, when a bit in the bitmap has a first value, the CORESET occupies corresponding time/frequency domain resources within the M slots or M OFDM symbols corresponding to the bit, and when the bit in the bitmap has a second value, there is no CORESET time/frequency domain resource within the M slots or M OFDM symbols corresponding to the bit.

In some possible embodiments of the present disclosure, the CORESET time domain pattern information includes the quantity of time domain positions and a time domain gap occupied by the CORESET in the time domain.

In some possible embodiments of the present disclosure, the CORESET time/frequency domain resource in each time domain position is determined in accordance with CORESET time/frequency domain configuration information.

In some possible embodiments of the present disclosure, the time domain gap is 0, or a unit of the time domain gap is M slots or M OFDM symbols.

In some possible embodiments of the present disclosure, the downlink control channel transmission time domain pattern configuration information includes search space time domain pattern configuration information carried in RRC signaling.

In some possible embodiments of the present disclosure, the search space time domain pattern configuration information is used to indicate that the search space occupies one time domain unit or a plurality of consecutive or discrete time domain units in the time domain, and the time domain unit includes K slots or K OFDM symbols, where K is a positive integer greater than 1.

In some possible embodiments of the present disclosure, the search space time domain pattern configuration information is used to indicate that a PDCCH candidate in the search space is mapped on one time domain unit or a plurality of consecutive or discrete time domain units.

In some possible embodiments of the present disclosure, the determination module is further configured to: map and create the search space at the at least one time domain position of a CORESET; and detect and receive the downlink control channel in the search space.

In a fourth aspect, the present disclosure provides in some embodiments a transmission device arranged at a network device, including a transmission module configured to transmit downlink control channel transmission time domain pattern configuration information to a terminal, the downlink control channel transmission time domain pattern configuration information being used by the terminal to determine a time domain resource range for transmission of a downlink control channel.

In some possible embodiments of the present disclosure, the transmission module is further configured to transmit the downlink control channel within the time domain resource range determined in accordance with the downlink control channel transmission time domain pattern configuration information.

In some possible embodiments of the present disclosure, the transmission module is further configured to transmit the downlink control channel transmission time domain pattern configuration information carried in high-layer signaling to the terminal, and the downlink control channel transmission time domain pattern configuration information is used by the terminal to determine a resource position to which a search space is mapped.

In some possible embodiments of the present disclosure, the downlink control channel transmission time domain pattern configuration information includes CORESET configuration information carried in signaling, and the CORESET configuration information includes CORESET time domain pattern information.

In some possible embodiments of the present disclosure, the CORESET time domain pattern information includes at least one resource position occupied by a CORESET in a time domain.

In some possible embodiments of the present disclosure, the CORESET time domain pattern information includes a bitmap having a length of N, and each bit in the bitmap corresponds to M slots or M OFDM symbols, where each of N and M is an integer greater than or equal to 1.

In some possible embodiments of the present disclosure, M is predefined through a protocol, or configured through high-layer signaling.

In some possible embodiments of the present disclosure, when a bit in the bitmap has a first value, the CORESET occupies corresponding time/frequency domain resources within the M slots or M OFDM symbols corresponding to the bit, and when the bit in the bitmap has a second value, there is no CORESET time/frequency domain resource within the M slots or M OFDM symbols corresponding to the bit.

In some possible embodiments of the present disclosure, the CORESET time domain pattern information includes the quantity of time domain positions and a time domain gap occupied by the CORESET in the time domain.

In some possible embodiments of the present disclosure, the CORESET time/frequency domain resource in each time domain position is determined in accordance with CORESET time/frequency domain configuration information.

In some possible embodiments of the present disclosure, the time domain gap is 0, or a unit of the time domain gap is M slots or M OFDM symbols.

In some possible embodiments of the present disclosure, the downlink control channel transmission time domain pattern configuration information includes search space time domain pattern configuration information carried in RRC signaling.

In some possible embodiments of the present disclosure, the search space time domain pattern configuration information is used to indicate that the search space occupies one time domain unit or a plurality of consecutive or discrete time domain units in the time domain, and the time domain unit includes K slots or K OFDM symbols, where K is a positive integer greater than 1.

In some possible embodiments of the present disclosure, the search space time domain pattern configuration information is used to indicate that a PDCCH candidate in the search space is mapped on one time domain unit or a plurality of consecutive or discrete time domain units.

In a fifth aspect, the present disclosure provides in some embodiments a transmission device arranged at a terminal, including a processor, a memory, and a program stored in the memory and executed by the processor. The program is executed by the processor so as to implement the above-mentioned transmission method in the first aspect.

In a sixth aspect, the present disclosure provides in some embodiments a transmission device arranged at a network device, including a processor, a memory, and a program stored in the memory and executed by the processor. The program is executed by the processor so as to implement the above-mentioned transmission method in the second aspect.

In a seventh aspect, the present disclosure provides in some embodiments a computer-readable storage medium storing therein a computer program. The computer program is executed by a processor, so as to implement steps of the transmission method in the first aspect or steps of the transmission method in the second aspect.

According to the embodiments of the present disclosure, the network device transmits the downlink control channel at a plurality of time domain positions of the CORESET, and correspondingly, the terminal receives the downlink control channel at the determined time domain positions in accordance with the downlink control channel transmission time domain pattern configuration information from the network device. As a result, it is able to ensure the transmission of the downlink control channel at a large aggregation level in a small-bandwidth scenario.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

In the embodiments of the present disclosure, such expressions as "illustrative" and "for example" are merely used to show examples or explanations. Any illustrative embodiment or scheme in the present disclosure shall not be construed as being superior over the other embodiment or scheme. Definitely, these words intend to exhibit relevant concepts in a concrete manner.

In the embodiments of the present disclosure, such words as "first" and "second" are merely used to differentiate similar objects rather than to imply any specific relationship among the objects or any specific order.

The technology described in the context is limited to a $5^{*h}$-Generation (5G) system or a subsequently-evolved communication system, and a Long Term Evolution (LTE)/LTE-Advanced (LTE-A) system, and it may also be applied to various wireless communication systems, e.g., Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA), or any other system.

The terms "system" and "network" may be replaced with each other. The CDMA system may be used to implement such radio technologies as CDMA2000 and Universal Terrestrial Radio Access (UTRA). The UTRA may include Wideband Code Division Multiple Access (WCDMA) and the other CDMA variants. The TDMA system may be used to implement such a radio technology as Global System for Mobile Communication (GSM). The OFDMA system may be used to implement such radio technologies as Ultra Mobile Broadband (UMB), Evolved-UTRA (E-UTRA), IEEE 802.11 (Wireless Fidelity (Wi-Fi)), IEEE 802.16 (WiMAX), IEEE 802.20, and Flash-OFDM. The UTRA and the E-UTRA are parts of a Universal Mobile Telecommunications System (UMTS). The LTE and a more advanced LTE (e.g., LTE-A) are new UMTS versions using the E-UTRA. The UTRA, E-UTRA, UMTS, LTE, LTE-A and GSM have been described in literatures from the $3^{rd}$-Generation Partnership Project (3GPP). The CDMA2000 and UMB have been described in literatures from 3GPP2. The technology described in the context may be applied to the above-mentioned systems and radio technologies, or applied to the other systems and radio technologies.

In the embodiments of the present disclosure, a network device transmits a downlink control channel carrying specific Downlink Control Information (DCI) at a plurality of time domain positions of a CORESET. A terminal detects and receives the DCI in the CORESET, determines a resource position to which a search space is mapped in accordance with the DCI, and detects and receives the downlink control channel in the search space transmitted in the CORESET.

In this regard, the network device transmits a PDCCH candidates at a large aggregation level at the plurality of time domain positions of the CORESET, and the terminal detects and the receives the PDCCH candidate at the large aggregation level at the determined time domain positions, so as to ensure the transmission of the downlink control channel at the large aggregation level in a small-bandwidth scenario.

Figure 1:
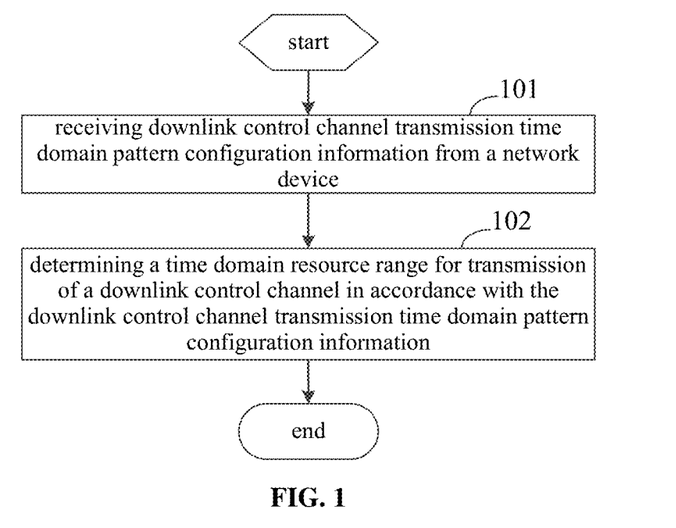
FIG. 1 is a flow chart of a transmission method according to one embodiment of the present disclosure.

As shown in FIG. 1, the present disclosure provides in some embodiments a transmission method for a terminal, which includes: Step 101 of receiving downlink control channel transmission time domain pattern configuration information from a network device; and Step 102 of determining a time domain resource range for transmission of a downlink control channel in accordance with the downlink control channel transmission time domain pattern configuration information.

In some embodiments of the present disclosure, the receiving the downlink control channel transmission time domain pattern configuration information from the network device includes receiving the downlink control channel transmission time domain pattern configuration information carried in high-layer signaling from the network device, and the determining the time domain resource range for the transmission of the downlink control channel in accordance with the downlink control channel transmission time domain pattern configuration information includes determining a resource position to which a search space is mapped in accordance with the downlink control channel transmission time domain pattern configuration information.

To be specific, the downlink control channel transmission time domain pattern configuration information includes the following two types.

First type: the downlink control channel transmission time domain pattern configuration information includes CORESET configuration information carried in RRC signaling, and the CORESET configuration information includes CORESET time domain pattern information.

In some embodiments of the present disclosure, the CORESET time domain pattern information includes at least one resource position occupied by a CORESET in a time domain.

In the embodiments of the present disclosure, the CORESET time domain pattern information includes a bitmap having a length of N, and each bit in the bitmap corresponds to M slots or M OFDM symbols, where each of N and M is an integer greater than or equal to 1.

In some possible embodiments of the present disclosure, M is predefined through a protocol, or configured through high-layer signaling.

Further, when a bit in the bitmap has a first value (e.g., 1), the CORESET occupies corresponding time/frequency domain resources within the M slots or M OFDM symbols corresponding to the bit, and when the bit in the bitmap has a second value (e.g., 0), there is no CORESET time/frequency domain resource within the M slots or M OFDM symbols corresponding to the bit.

In some embodiments of the present disclosure, the CORESET time domain pattern information includes the quantity of time domain positions and a time domain gap occupied by the CORESET in the time domain.

In the embodiments of the present disclosure, the CORESET time/frequency domain resource in each time domain position is determined in accordance with CORESET time/frequency domain configuration information.

In some possible embodiments of the present disclosure, the time domain gap is 0, or a unit of the time domain gap is M slots or M OFDM symbols.

Second type: the downlink control channel transmission time domain pattern configuration information includes Search Space (SS) time domain pattern configuration information carried in RRC signaling.

In some embodiments of the present disclosure, the search space time domain pattern configuration information is used to indicate that the search space occupies one time domain unit or a plurality of consecutive or discrete time domain units in the time domain, and the time domain unit includes K slots or K OFDM symbols, where K is a positive integer greater than 1.

In some embodiments of the present disclosure, the search space time domain pattern configuration information is used to indicate that a PDCCH candidate in the search space is mapped on one time domain unit or a plurality of consecutive or discrete time domain units.

Further, the determining the time domain source range for the transmission of the downlink control channel includes: mapping and creating the search space at the at least one time domain position of a CORESET; and detecting and receiving the downlink control channel in the search space.

According to the embodiments of the present disclosure, the network device transmits the downlink control channel at a plurality of time domain positions of the CORESET, and correspondingly, the terminal receives the downlink control channel at the determined time domain positions in accordance with the downlink control channel transmission time domain pattern configuration information from the network device. As a result, it is able to ensure the transmission of the downlink control channel at a large aggregation level in a small-bandwidth scenario.

Figure 2:
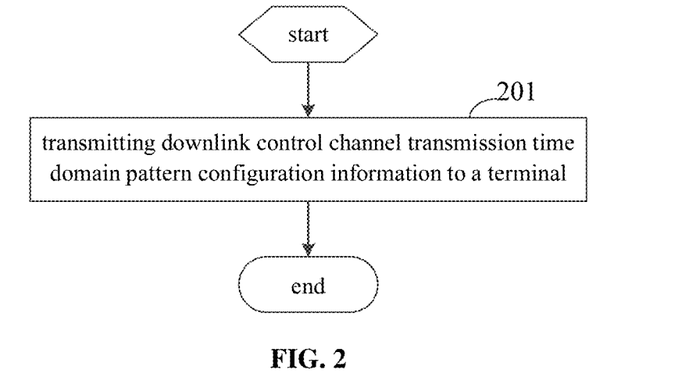
FIG. 2 is another flow chart of the transmission method according to one embodiment of the present disclosure.

As shown in FIG. 2, the present disclosure provides in some embodiments a transmission method for a network device, which includes Step 201 of transmitting downlink control channel transmission time domain pattern configuration information to a terminal. In the embodiments of the present disclosure, the downlink control channel transmission time domain pattern configuration information is used by the terminal to determine a time domain resource range for transmission of a downlink control channel.

Further, the network device transmits the downlink control channel within the time domain resource range determined in accordance with the downlink control channel transmission time domain pattern configuration information.

In some embodiments of the present disclosure, the transmitting the downlink control channel transmission time domain pattern configuration information to the terminal includes transmitting the downlink control channel transmission time domain pattern configuration information carried in high-layer signaling to the terminal, and the downlink control channel transmission time domain pattern configuration information is used by the terminal to determine a resource position to which a search space is mapped.

To be specific, the downlink control channel transmission time domain pattern configuration information includes the following two types.

First type: the downlink control channel transmission time domain pattern configuration information includes CORESET configuration information carried in RRC signaling, and the CORESET configuration information includes CORESET time domain pattern information.

In some embodiments of the present disclosure, the CORESET time domain pattern information includes at least one resource position occupied by a CORESET in a time domain.

In the embodiments of the present disclosure, the CORESET time domain pattern information includes a bitmap having a length of N, and each bit in the bitmap corresponds to M slots or M OFDM symbols, where each of N and M is an integer greater than or equal to 1.

In some possible embodiments of the present disclosure, M is predefined through a protocol, or configured through high-layer signaling.

Further, when a bit in the bitmap has a first value (e.g., 1), the CORESET occupies corresponding time/frequency domain resources within the M slots or M OFDM symbols corresponding to the bit, and when the bit in the bitmap has a second value (e.g., 0), there is no CORESET time/frequency domain resource within the M slots or M OFDM symbols corresponding to the bit.

In some embodiments of the present disclosure, the CORESET time domain pattern information includes the quantity of time domain positions and a time domain gap occupied by the CORESET in the time domain.

In the embodiments of the present disclosure, the CORESET time/frequency domain resource in each time domain position is determined in accordance with CORESET time/frequency domain configuration information.

In some possible embodiments of the present disclosure, the time domain gap is 0, or a unit of the time domain gap is M slots or M OFDM symbols.

Second type: the downlink control channel transmission time domain pattern configuration information includes search space time domain pattern configuration information carried in RRC signaling.

In some embodiments of the present disclosure, the search space time domain pattern configuration information is used to indicate that the search space occupies one time domain unit or a plurality of consecutive or discrete time domain units in the time domain, and the time domain unit includes K slots or K OFDM symbols, where K is a positive integer greater than 1.

In some embodiments of the present disclosure, the search space time domain pattern configuration information is used to indicate that a PDCCH candidate in the search space is mapped on one time domain unit or a plurality of consecutive or discrete time domain units.

According to the embodiments of the present disclosure, the network device transmits the downlink control channel at a plurality of time domain positions of the CORESET, and correspondingly, the terminal receives the downlink control channel at the determined time domain positions in accordance with the downlink control channel transmission time domain pattern configuration information from the network device. As a result, it is able to ensure the transmission of the downlink control channel at a large aggregation level in a small-bandwidth scenario.

The method in the embodiments of the present disclosure will be described hereinafter in conjunction with specific applications.

In a first embodiment of the present disclosure, a base station configures downlink control channel-related configuration information for the terminal through UE-specific RRC signaling. The base station configures a search space SS #1 for the terminal, the search space SS #1 is associated with a CORESET #1, and a monitoring cycle of the search space includes T slots. In addition, the base station configures a time domain pattern P for the CORESET #1. In this embodiment of the present disclosure, as a part of parameters, the CORESET occupies 3 OFDM symbols in the time domain, and 12 Resource Blocks (RBs) in a frequency domain.

Due to the requirement on coverage, the downlink control channel needs to be transmitted at a relatively high aggregation level, e.g., an aggregation level 8 or 16.

Figure 3:
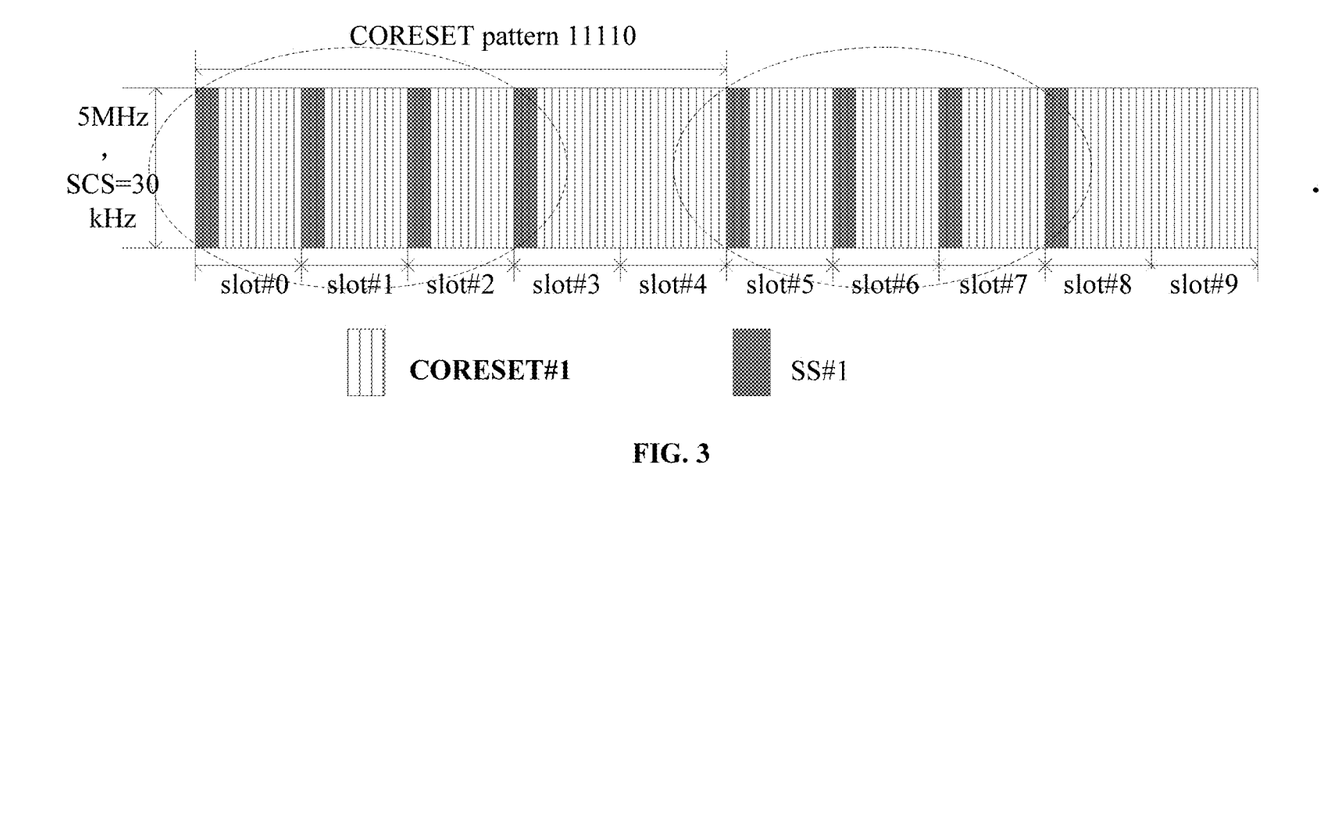
FIG. 3 is a schematic view showing an application scenario according to one embodiment of the present disclosure.

Based on the other configuration parameters of the CORESET and the search space, the base station configures a time domain pattern parameter for the CORESET, this parameter is a bitmap having a length of N bits, and each bit in the bitmap corresponds to consecutive M slots or OFDM symbols. In this embodiment of the present disclosure, it is presumed that the bitmap has a length of 5 bits, and each bit corresponds to one slot. Presumed that the bitmap is 1110, the complete CORESET #1 occupies 3 OFDM symbols and 12 RBs within consecutive 4 slots. A time domain start symbol of the CORESET #1 within each slot is determined in accordance with a start symbol of the search space associated with the CORESET #1, or it is a specific OFDM symbol within each slot (the specific OFDM symbols is predefined through a protocol or notified through RRC signaling, which is not particularly defined herein). FIG. 3 shows an application scenario.

In this embodiment of the present disclosure, the search space includes a PDCCH candidate at AL16 and two PDCCH candidates at AL8. Within one slot, the CORESET occupies 3 OFDM symbols and 12 RBs, i.e., 36 RBs. Hence, the configuration of the CORESET within one slot does not meet the requirement on the transmission at AL8 and AL16. After the configuration of a CORESET pattern, the search space is transmitted within a plurality of slots indicated by the CORESET pattern. Here, a total quantity of RBs available for the transmission of the PDCCH candidates is 36*4=144. A hash function of the search space is effective within all the 144 RBs determined in accordance with the time domain pattern of the CORESET #1. Further, one PDCCH candidate at AL8 or AL16 is mapped within a plurality of slots occupied by the CORESET #1.

It should be appreciated that, the CORESET pattern occupies inconsecutive slots, and the search space has a structure different from that mentioned hereinabove. The transmission at a larger AL, e.g., AL32, will not be particularly defined herein.

Further, each bit in the bitmap corresponds to M consecutive slots, where M is a positive integer greater than 1, and M is predefined through a protocol or configured through high-layer signaling, which will not be particularly defined herein.

Further, a time domain range indicated by the bitmap shall be smaller than the monitoring cycle of the associated search space.

Further, each bit in the bitmap of the CORESET pattern corresponds to M consecutive OFDM symbols.

In a second embodiment of the present disclosure, the base station configures downlink control channel-related configuration information for the terminal through UE-specific RRC signaling. The base station configures a search space SS #1 for the terminal, the search space SS #1 is associated with a CORESET #1, and a monitoring cycle of the search space includes T slots. In addition, the base station configures a time domain pattern P for the CORESET #1. In this embodiment of the present disclosure, T=10, a transmission bandwidth is 5 MHz, and a subcarrier spacing is 30 kHz. In addition, as a part of parameters, the CORESET occupies 3 OFDM symbols in the time domain, and 12 Resource Blocks (RBs) in a frequency domain.

Due to the requirement on coverage, the downlink control channel needs to be transmitted at a relatively high aggregation level, e.g., an aggregation level 8 or 16.

Based on the other configuration parameters of the CORESET and the search space, the base station configures a time domain pattern parameter for the CORESET. The time domain pattern parameter includes: (1) the quantity of time units occupied by the CORESET, the time unit including M consecutive slots or OFDM symbols; and (2) a gap G between the time units occupied by the CORESET, a unit of the gap G being the time unit.

Figure 4A:
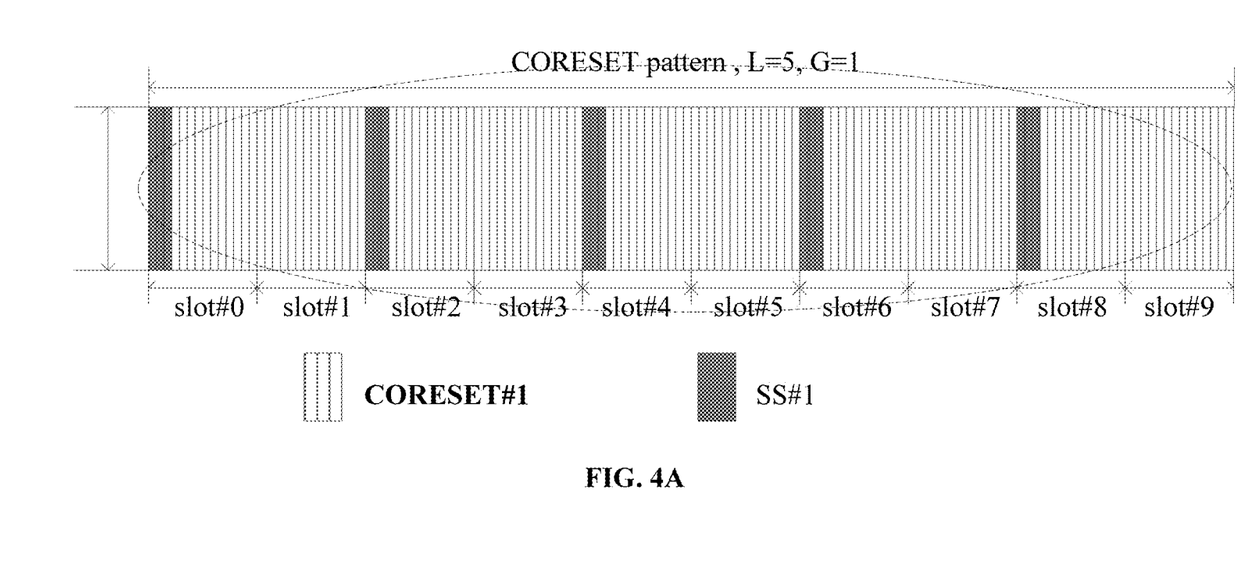
FIG. 4A is another schematic view showing the application scenario according to one embodiment of the present disclosure.
Figure 4B:
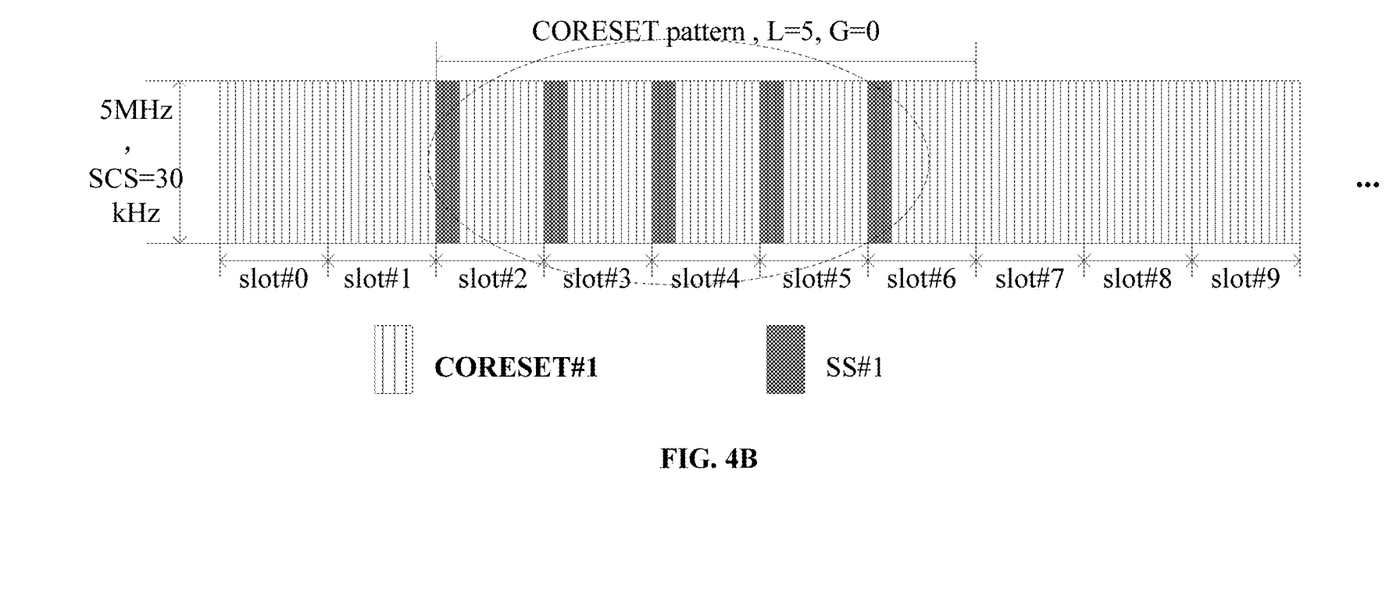
FIG. 4B is yet another schematic view showing the application scenario according to one embodiment of the present disclosure.

It is presumed that the time unit includes one slot, the time interval between the time units is 0, and the quantity of time units occupied by the CORESET is 5 slots. A time domain start position of the CORESET pattern is determined in accordance with a start position of the associated search space. Presumed that a time domain offset of the search space is 2 slots, FIGS. 4A and 4B show the CORESET patterns when G=1 (corresponding to FIG. 4A) and G=0 (corresponding to FIG. 4B) respectively.

In this embodiment of the present disclosure, the search space includes a PDCCH candidate at AL16 and two PDCCH candidates at AL8. Within one slot, the CORESET occupies 3 OFDM symbols and 12 RBs, i.e., 36 RBs. Hence, the configuration of the CORESET within one slot does not meet the requirement on the transmission at AL8 and AL16. After the configuration of a CORESET pattern, the search space is transmitted within a plurality of slots indicated by the CORESET pattern. Here, a total quantity of RBs available for the transmission of the PDCCH candidates is 36*5=180. A hash function of the search space is effective within all the 180 RBs determined in accordance with the time domain pattern of the CORESET #1. Further, one PDCCH candidate at AL8 or AL16 is mapped within a plurality of slots occupied by the CORESET #1.

It should be appreciated that, in this embodiment of the present disclosure, the quantity of time domain units occupied by the CORESET pattern in the time domain, the gap between the time domain units and the quantity of slots in each time domain unit will not be particularly defined herein.

Further, a time domain range indicated by the bitmap shall be smaller than the monitoring cycle of the associated search space.

Further, the time domain unit occupied by the CORESET pattern includes M consecutive OFDM symbols, where M is a positive integer greater than 1. A specific value of M will not be particularly defined herein.

In a third embodiment of the present disclosure, the base station configures downlink control channel-related configuration information for the terminal through UE-specific RRC signaling. The base station configures a search space SS #1 for the terminal, the search space SS #1 is associated with a CORESET #1, and a monitoring cycle of the search space includes T slots. In addition, the base station configures a time domain pattern P for the CORESET #1. In this embodiment of the present disclosure, T=10, a transmission bandwidth is 5 MHz, and a subcarrier spacing is 30 kHz. In addition, as a part of parameters, the CORESET occupies 3 OFDM symbols in the time domain, and 12 Resource Blocks (RBs) in a frequency domain.

Due to the requirement on coverage, the downlink control channel needs to be transmitted at a relatively high aggregation level, e.g., an aggregation level 8 or 16.

Figure 5:
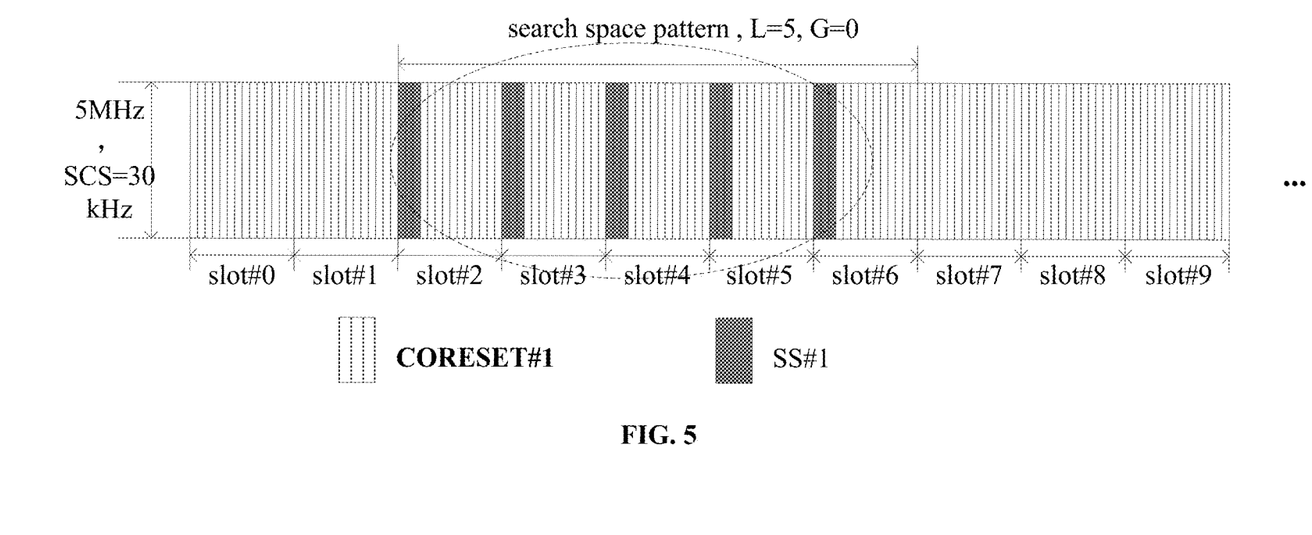
FIG. 5 is still yet another schematic view showing the application scenario according to one embodiment of the present disclosure.

The base station configures the quantity L of time units occupied by the SS #1 in the time domain, and the time unit includes M consecutive slots or OFDM symbols. The SS #1 is mapped on the L time units. In this embodiment of the present disclosure, L is 5 and the time unit includes one slot. FIG. 5 shows an application scenario.

In this embodiment of the present disclosure, the search space includes a PDCCH candidate at AL16 and two PDCCH candidates at AL8. Within one slot, the CORESET occupies 3 OFDM symbols and 12 RBs, i.e., 36 RBs. Hence, the configuration of the CORESET within one slot does not meet the requirement on the transmission at AL8 and AL16. After the configuration of a CORESET pattern, the search space is transmitted within a plurality of slots indicated by the CORESET pattern. Here, a total quantity of RBs available for the transmission of the PDCCH candidates is 36*5=180. A hash function of the search space is effective within all the 180 RBs determined in accordance with the time domain pattern of the CORESET #1. Further, one PDCCH candidate at AL8 or AL16 is mapped within a plurality of slots occupied by the CORESET #1.

Figure 6:
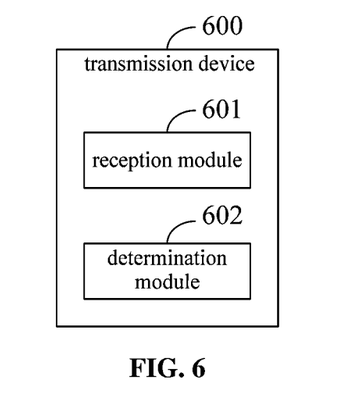
FIG. 6 is a schematic view showing a transmission device according to one embodiment of the present disclosure.

As shown in FIG. 6, the present disclosure further provides in some embodiments a transmission device 600 for a terminal, which includes: a reception module 601 configured to receive downlink control channel transmission time domain pattern configuration information from a network device; and a determination module 602 configured to determine a time domain resource range for transmission of a downlink control channel in accordance with the downlink control channel transmission time domain pattern configuration information.

In some embodiments of the present disclosure, the reception module 601 is further configured to receive the downlink control channel transmission time domain pattern configuration information carried in high-layer signaling from the network device, and the determination module 602 is further configured to determine a resource position to which a search space is mapped in accordance with the downlink control channel transmission time domain pattern configuration information.

In some embodiments of the present disclosure, the downlink control channel transmission time domain pattern configuration information includes CORESET configuration information carried in RRC signaling, and the CORESET configuration information includes CORESET time domain pattern information.

In some embodiments of the present disclosure, the CORESET time domain pattern information includes at least one resource position occupied by a CORESET in a time domain.

In some embodiments of the present disclosure, the CORESET time domain pattern information includes a bitmap having a length of N, and each bit in the bitmap corresponds to M slots or M OFDM symbols, where each of N and M is an integer greater than or equal to 1.

In some embodiments of the present disclosure, M is predefined through a protocol, or configured through high-layer signaling.

In some embodiments of the present disclosure, when a bit in the bitmap has a first value, the CORESET occupies corresponding time/frequency domain resources within the M slots or M OFDM symbols corresponding to the bit, and when the bit in the bitmap has a second value, there is no CORESET time/frequency domain resource within the M slots or M OFDM symbols corresponding to the bit.

In some embodiments of the present disclosure, the CORESET time domain pattern information includes the quantity of time domain positions and a time domain gap occupied by the CORESET in the time domain.

In some embodiments of the present disclosure, the CORESET time/frequency domain resource in each time domain position is determined in accordance with CORESET time/frequency domain configuration information.

In some embodiments of the present disclosure, the time domain gap is 0, or a unit of the time domain gap is M slots or M OFDM symbols.

In some embodiments of the present disclosure, the downlink control channel transmission time domain pattern configuration information includes search space time domain pattern configuration information carried in RRC signaling.

In some embodiments of the present disclosure, the search space time domain pattern configuration information is used to indicate that the search space occupies one time domain unit or a plurality of consecutive or discrete time domain units in the time domain, and the time domain unit includes K slots or K OFDM symbols, where K is a positive integer greater than 1.

In some embodiments of the present disclosure, the search space time domain pattern configuration information is used to indicate that a PDCCH candidate in the search space is mapped on one time domain unit or a plurality of consecutive or discrete time domain units.

In some embodiments of the present disclosure, the determination module 602 is further configured to: map and create the search space at the at least one time domain position of a CORESET; and detect and receive the downlink control channel in the search space.

According to the embodiments of the present disclosure, the network device transmits the downlink control channel at a plurality of time domain positions of the CORESET, and correspondingly, the terminal receives the downlink control channel at the determined time domain positions in accordance with the downlink control channel transmission time domain pattern configuration information from the network device. As a result, it is able to ensure the transmission of the downlink control channel at a large aggregation level in a small-bandwidth scenario.

Figure 7:
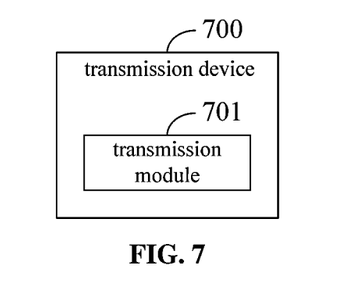
FIG. 7 is another schematic view showing the transmission device according to one embodiment of the present disclosure.

As shown in FIG. 7, the present disclosure further provides in some embodiments a transmission device 700 for a network device, which includes a transmission module 701 configured to transmit downlink control channel transmission time domain pattern configuration information to a terminal, the downlink control channel transmission time domain pattern configuration information being used by the terminal to determine a time domain resource range for transmission of a downlink control channel.

In some embodiments of the present disclosure, the transmission module 701 is further configured to transmit the downlink control channel within the time domain resource range determined in accordance with the downlink control channel transmission time domain pattern configuration information.

In some embodiments of the present disclosure, the transmission module 701 is further configured to transmit the downlink control channel transmission time domain pattern configuration information carried in high-layer signaling to the terminal, and the downlink control channel transmission time domain pattern configuration information is used by the terminal to determine a resource position to which a search space is mapped.

In some embodiments of the present disclosure, the downlink control channel transmission time domain pattern configuration information includes CORESET configuration information carried in signaling, and the CORESET configuration information includes CORESET time domain pattern information.

In some embodiments of the present disclosure, the CORESET time domain pattern information includes at least one resource position occupied by a CORESET in a time domain.

In some embodiments of the present disclosure, the CORESET time domain pattern information includes a bitmap having a length of N, and each bit in the bitmap corresponds to M slots or M OFDM symbols, where each of N and M is an integer greater than or equal to 1.

In some embodiments of the present disclosure, M is predefined through a protocol, or configured through high-layer signaling.

In some embodiments of the present disclosure, when a bit in the bitmap has a first value, the CORESET occupies corresponding time/frequency domain resources within the M slots or M OFDM symbols corresponding to the bit, and when the bit in the bitmap has a second value, there is no CORESET time/frequency domain resource within the M slots or M OFDM symbols corresponding to the bit.

In some embodiments of the present disclosure, the CORESET time domain pattern information includes the quantity of time domain positions and a time domain gap occupied by the CORESET in the time domain.

In some embodiments of the present disclosure, the CORESET time/frequency domain resource in each time domain position is determined in accordance with CORESET time/frequency domain configuration information.

In some embodiments of the present disclosure, the time domain gap is 0, or a unit of the time domain gap is M slots or M OFDM symbols.

In some embodiments of the present disclosure, the downlink control channel transmission time domain pattern configuration information includes search space time domain pattern configuration information carried in RRC signaling.

In some embodiments of the present disclosure, the search space time domain pattern configuration information is used to indicate that the search space occupies one time domain unit or a plurality of consecutive or discrete time domain units in the time domain, and the time domain unit includes K slots or K OFDM symbols, where K is a positive integer greater than 1.

In some embodiments of the present disclosure, the search space time domain pattern configuration information is used to indicate that a PDCCH candidate in the search space is mapped on one time domain unit or a plurality of consecutive or discrete time domain units.

According to the embodiments of the present disclosure, the network device transmits the downlink control channel at a plurality of time domain positions of the CORESET, and correspondingly, the terminal receives the downlink control channel at the determined time domain positions in accordance with the downlink control channel transmission time domain pattern configuration information from the network device. As a result, it is able to ensure the transmission of the downlink control channel at a large aggregation level in a small-bandwidth scenario.

Figure 8:
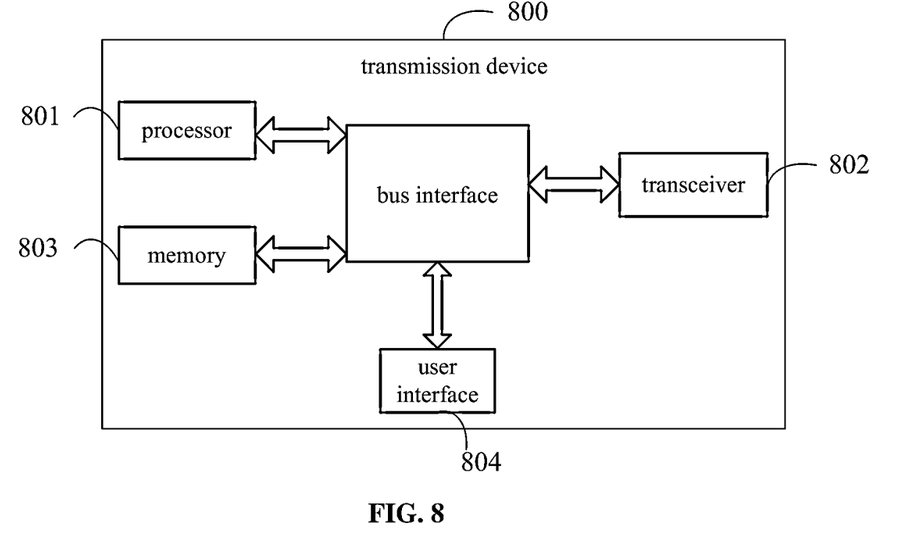
FIG. 8 is a schematic view showing a transmission device according to one embodiment of the present disclosure.

As shown in FIG. 8, the present disclosure further provides in some embodiments a transmission device 800 for a terminal, which includes a processor 801, a transceiver 802, a memory 803, a user interface 804 and a bus interface.

In the embodiments of the present disclosure, the transmission device 800 further includes a program stored in the memory 803 and executed by the processor 801.

The processor 801 is configured to execute the program, so as to: receive downlink control channel transmission time domain pattern configuration information from a network device; and determine a time domain resource range for transmission of a downlink control channel in accordance with the downlink control channel transmission time domain pattern configuration information.

It should be appreciated that, in the embodiments of the present disclosure, the program is executed by the processor 801 so as to implement the above-mentioned transmission method with a same technical effect, which will not be particularly defined herein.

In FIG. 8, bus architecture may include a number of buses and bridges connected to each other, so as to connect various circuits for one or more processors 801 and one or more memories 803. In addition, as is known in the art, the bus architecture may be used to connect any other circuits, such as a circuit for a peripheral device, a circuit for a voltage stabilizer and a power management circuit. The bus interface may be provided, and the transceiver 802 may consist of a plurality of elements, i.e., a transmitter and a receiver for communication with any other devices over a transmission medium. With respect to different UEs, the user interface 804 may also be provided for devices which are to be arranged inside or outside the UE, and these devices may include but not limited to a keypad, a display, a speaker, a microphone and a joystick.

The processor 801 may take charge of managing the bus architecture as well as general processings. The memory 803 may store therein data for the operation of the processor 801.

It should be appreciated that, the transmission device corresponds to the above-mentioned method for the terminal, and the implementation of the transmission device may refer to that of the above-mentioned method with a same or similar technical effect.

Figure 9:
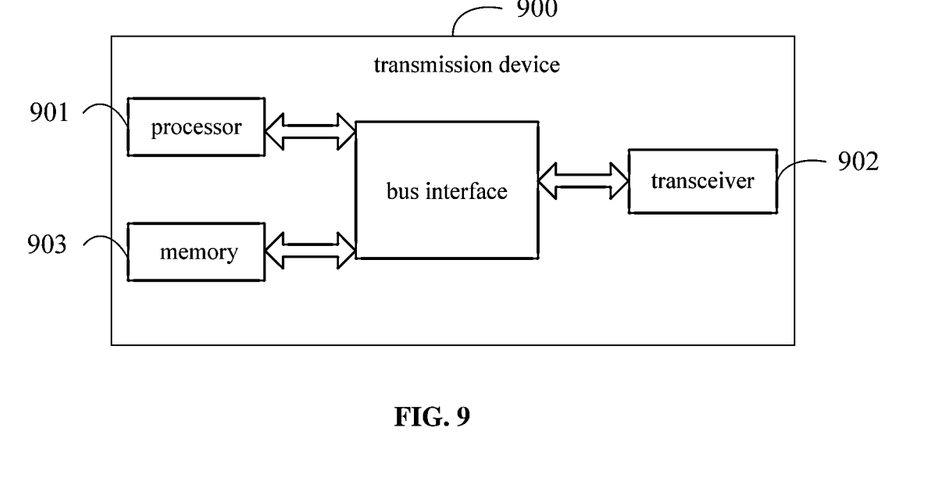
FIG. 9 is another schematic view showing the transmission device according to one embodiment of the present disclosure.

As shown in FIG. 9, the present disclosure further provides in some embodiments a transmission device 900 for a network device, which includes a processor 901, a transceiver 902, a memory 903 and a bus interface.

In the embodiments of the present disclosure, the transmission device 900 further includes a program stored in the memory 903 and executed by the processor 901.

The processor 901 is configured to execute the program so as to transmit downlink control channel transmission time domain pattern configuration information to a terminal, the downlink control channel transmission time domain pattern configuration information being used by the terminal to determine a time domain resource range for transmission of a downlink control channel.

It should be appreciated that, in the embodiments of the present disclosure, the program is executed by the processor 901 so as to implement the above-mentioned transmission method with a same technical effect, which will not be particularly defined herein.

In FIG. 9, bus architecture may include a number of buses and bridges connected to each other, so as to connect various circuits for one or more processors 901 and one or more memories 903. In addition, as is known in the art, the bus architecture may be used to connect any other circuits, such as a circuit for a peripheral device, a circuit for a voltage stabilizer and a power management circuit. The bus interface may be provided, and the transceiver 902 may consist of a plurality of elements, i.e., a transmitter and a receiver for communication with any other devices over a transmission medium.

The processor 901 may take charge of managing the bus architecture as well as general processings. The memory 903 may store therein data for the operation of the processor 901.

It should be appreciated that, the transmission device corresponds to the above-mentioned method for the network device, and the implementation of the transmission device may refer to that of the above-mentioned method with a same or similar technical effect.

The present disclosure further provides in some embodiments a computer-readable storage medium storing therein a computer program. The computer program is executed by a processor, so as to implement the above-mentioned method with a same technical effect, which will not be particularly defined herein. The computer-readable storage medium may be, e.g., a read-only memory (Read-Only Memory, ROM), a random access memory (Random Access Memory, RAM), a magnetic disk or an optical disk.

It should be appreciated that, units and steps described in the embodiments of the present disclosure are implemented in the form of electronic hardware, or a combination of a computer program and the electronic hardware. Whether or not these functions are executed by hardware or software depends on specific applications or design constraints of the technical solution. Different methods are adopted with respect to the specific applications so as to achieve the described functions, without departing from the scope of the present disclosure.

It should be further appreciated that, for convenience and clarification, operation procedures of the system, device and units described hereinabove refer to the corresponding procedures in the method embodiment, and thus will not be particularly defined herein.

It should be further appreciated that, the device and method are implemented in any other ways. For example, the embodiments for the apparatus are merely for illustrative purposes, and the modules or units are provided merely on the basis of their logic functions. During the actual application, some modules or units are combined together or integrated into another system. Alternatively, some functions of the module or units are omitted or not executed. In addition, the coupling connection, direct coupling connection or communication connection between the modules or units is implemented via interfaces, and the indirect coupling connection or communication connection between the modules or units is implemented in an electrical or mechanical form or in any other form.

The units are, or are not, physically separated from each other. The units for displaying are, or are not, physical units, i.e., they are arranged at an identical position, or distributed on a plurality of network elements. Parts or all of the units are selected in accordance with the practical need, so as to achieve the purpose of the present disclosure.

In addition, the functional units in the embodiments of the present disclosure are integrated into a processing unit, or the functional units exist independently, or two or more functional units are combined together.

In the case that the functional units are implemented in a software form and sold or used as a separate product, they are stored in a computer-readable medium. Based on this, the technical solutions of the present disclosure, partial or full, or parts of the technical solutions of the present disclosure contributing to the related art, appear in the form of software products, which are stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

It should be appreciated that, all or parts of the steps in the method may be implemented by related hardware under the control of a computer program. The computer program may be stored in a computer-readable storage medium, and it may be executed so as to implement the steps in the above-mentioned method embodiments. The storage medium may be a magnetic disk, an optical disk, an ROM or an RAM.

It should be appreciated that, the embodiments of the present disclosure may be implemented by hardware, software, firmware, middleware, microcode or a combination thereof. For the hardware implementation, the processor may include one or more of an Application Specific Integrated Circuit (ASIC), a Digital Signal Processor (DSP), a DSP device (DSPD), a Programmable Logic Device (PLD), a Field-Programmable Gate Array (FPGA), a general-purpose processor, a controller, a microcontroller, a microprocessor, any other electronic unit capable of achieving the functions in the present disclosure, or a combination thereof.

For the software implementation, the scheme in the embodiments of the present disclosure may be implemented through modules capable of achieving the functions in the present disclosure (e.g., processes or functions). Software codes may be stored in the memory and executed by the processor. The memory may be implemented inside or outside the processor.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A transmission method performed by a terminal, the transmission method comprising:
receiving time domain pattern configuration information from a network device; and
determining a time domain resource range for transmission of a downlink control channel in accordance with the time domain pattern configuration information,
wherein the time domain pattern configuration information comprises Control Resource Set (CORESET) configuration information carried in Radio Resource Control (RRC) signaling, and the CORESET configuration information comprises CORESET time domain pattern information,
wherein the CORESET time domain pattern information comprises at least one resource position occupied by a CORESET in a time domain, the CORESET time domain pattern information comprises a bitmap having a length of N, and each bit in the bitmap corresponds to M slots or M Orthogonal Frequency Division Multiplexing (OFDM) symbols, where each of N and M is an integer greater than or equal to 1; or
wherein the CORESET time domain pattern information comprises the quantity of time domain positions and a time domain gap occupied by the CORESET in the time domain.

2. The transmission method according to claim 1, wherein the receiving the time domain pattern configuration information from the network device comprises: receiving the time domain pattern configuration information carried in RRC signaling from the network device.

3. The transmission method according to claim 1,
wherein the time domain pattern configuration information comprises search space time domain pattern configuration information carried in RRC signaling.

4. The transmission method according to claim 3, wherein the search space time domain pattern configuration information is used to indicate that the search space occupies one time domain unit or a plurality of consecutive or discrete time domain units in the time domain, and the time domain unit comprises K slots or K OFDM symbols, where K is a positive integer greater than 1; and/or
that a Physical Downlink Control Channel (PDCCH) candidate in the search space is mapped on one time domain unit or a plurality of consecutive or discrete time domain units.

5. The transmission method according to claim 1,
wherein M is predefined through a protocol, or configured through RRC signaling.

6. The transmission method according to claim 1, wherein when a bit in the bitmap has a first value, the CORESET occupies corresponding time/frequency domain resources within the M slots or M OFDM symbols corresponding to the bit; or
when the bit in the bitmap has a second value, the CORESET does not occupy corresponding time/frequency domain resources within the M slots or M OFDM symbols corresponding to the bit.

7. The transmission method according to claim 1, wherein the CORESET time/frequency domain resource in each time domain position is determined in accordance with CORESET time/frequency domain configuration information;
wherein the time domain gap is 0, or a unit of the time domain gap is M slots or M OFDM symbols.

8. The transmission method according to claim 1, wherein the determining the time domain source range for the transmission of the downlink control channel comprises:

mapping and creating the search space at the at least one time domain position of a CORESET;
detecting and receiving the downlink control channel in the search space; or
determining a resource position to which a search space is mapped in accordance with the time domain pattern configuration information.

9. A transmission method performed by a network device, the transmission method comprising:
transmitting time domain pattern configuration information to a terminal, the time domain pattern configuration information being used by the terminal to determine a time domain resource range for transmission of a downlink control channel;
transmitting the downlink control channel within the time domain resource range determined in accordance with the time domain pattern configuration information,
wherein the time domain pattern configuration information comprises Control Resource Set (CORESET) configuration information carried in Radio Resource Control (RRC) signaling, and the CORESET configuration information comprises CORESET time domain pattern information,
wherein the CORESET time domain pattern information comprises at least one resource position occupied by a CORESET in a time domain, the CORESET time domain pattern information comprises a bitmap having a length of N, and each bit in the bitmap corresponds to M slots or M Orthogonal Frequency Division Multiplexing (OFDM) symbols, where each of N and M is an integer greater than or equal to 1; or
the CORESET time domain pattern information comprises the quantity of time domain positions and a time domain gap occupied by the CORESET in the time domain.

10. The transmission method according to claim 9,
wherein the time domain pattern configuration information comprises search space time domain pattern configuration information carried in RRC signaling.

11. The transmission method according to claim 10, wherein the search space time domain pattern configuration information is used to indicate that the search space occupies one time domain unit or a plurality of consecutive or discrete time domain units in the time domain, and the time domain unit comprises K slots or K OFDM symbols, where K is a positive integer greater than 1; and/or
that a Physical Downlink Control Channel (PDCCH) candidate in the search space is mapped on one time domain unit or a plurality of consecutive or discrete time domain units.

12. The transmission method according to claim 9,
wherein M is predefined through a protocol, or configured through RRC signaling.

13. The transmission method according to claim 9, wherein when a bit in the bitmap has a first value, the CORESET occupies corresponding time/frequency domain resources within the M slots or M OFDM symbols corresponding to the bit; or
when the bit in the bitmap has a second value, the CORESET does not occupy corresponding time/frequency domain resources within the M slots or M OFDM symbols corresponding to the bit.

14. The transmission method according to claim 9, wherein the CORESET time/frequency domain resource in each time domain position is determined in accordance with CORESET time/frequency domain configuration information;

wherein the time domain gap is 0, or a unit of the time domain gap is M slots or M OFDM symbols.

15. A transmission device arranged at a terminal, the transmission device comprising a processor, a memory, and a program stored in the memory and executed by the processor, wherein the program is executed by the processor so as to:

receive time domain pattern configuration information from a network device; and determine a time domain resource range for transmission of a downlink control channel in accordance with the time domain pattern configuration information, wherein the time domain pattern configuration information comprises Control Resource Set (CORESET) configuration information carried in Radio Resource Control (RRC) signaling, and the CORESET configuration information comprises CORESET time domain pattern information, wherein the CORESET time domain pattern information comprises at least one resource position occupied by a CORESET in a time domain, the CORESET time domain pattern information comprises a bitmap having a length of N, and each bit in the bitmap corresponds to M slots or M Orthogonal Frequency Division Multiplexing (OFDM) symbols, where each of N and M is an integer greater than or equal to 1; or wherein the CORESET time domain pattern information comprises the quantity of time domain positions and a time domain gap occupied by the CORESET in the time domain.

16. The transmission device according to claim 15, wherein the time domain pattern configuration information comprises search space time domain pattern configuration information carried in RRC signaling.

17. The transmission device according to claim 15, wherein M is predefined through a protocol, or configured through RRC signaling.

18. A transmission device arranged at a network device, the transmission device comprising a processor, a memory, and a program stored in the memory and executed by the processor, wherein the program is executed by the processor so as to realize the transmission method according to claim 9.

19. The transmission device according to claim 18, wherein the time domain pattern configuration information comprises search space time domain pattern configuration information carried in RRC signaling.

20. The transmission device according to claim 18, wherein M is predefined through a protocol, or configured through RRC signaling.

* * * * *